US010468912B2

(12) United States Patent
Sempel et al.

(10) Patent No.: US 10,468,912 B2
(45) Date of Patent: Nov. 5, 2019

(54) CAPACITIVE CONTACTLESS POWERING SYSTEM

(75) Inventors: Adrianus Sempel, Waalre (NL); Eberhard Waffenschmidt, Aachen (DE); Dave Willem Van Goor, Nederweert (NL); Henricus Theorodus Van Der Zanden, Sint-Oedenrode (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 1546 days.

(21) Appl. No.: 14/236,712

(22) PCT Filed: Aug. 14, 2012

(86) PCT No.: PCT/IB2012/054136
§ 371 (c)(1),
(2), (4) Date: Feb. 3, 2014

(87) PCT Pub. No.: WO2013/024432
PCT Pub. Date: Feb. 21, 2013

(65) Prior Publication Data
US 2014/0232185 A1    Aug. 21, 2014

Related U.S. Application Data

(60) Provisional application No. 61/523,922, filed on Aug. 16, 2011, provisional application No. 61/523,941, (Continued)

(51) Int. Cl.
*H02J 7/02* (2016.01)
*H02J 5/00* (2016.01)
(Continued)

(52) U.S. Cl.
CPC .............. *H02J 50/05* (2016.02); *H02J 50/12* (2016.02); *Y10T 29/49117* (2015.01); *Y10T 307/25* (2015.04)

(58) Field of Classification Search
CPC ..... H02J 5/005; H02J 7/025; Y10T 29/49117; Y10T 307/25
See application file for complete search history.

(56) References Cited

U.S. PATENT DOCUMENTS 7,271,569 B2   9/2007 Oglesbee
8,374,545 B2*  2/2013 Menegoli ............. H04B 5/0037
                                                 455/343.1
(Continued)

FOREIGN PATENT DOCUMENTS

CN      1474921 A       2/2004
DE  102009003846 A1    11/2010
(Continued)

OTHER PUBLICATIONS

Kline, "Capacitive Power Transfer", Electrical Engineering and Computer Sciences, University of California at Berkely, Technical Report No. UCB/EECS-2010-155; HTTP://www.eecs.Berkely.edu/Pubs/techrpts/2010/Eecs-2010-155.Html; Dec. 15, 2010, p. 1-37.
(Continued)

*Primary Examiner* — Rexford N Barnie
*Assistant Examiner* — Elim Ortiz
(74) *Attorney, Agent, or Firm* — Akarsh P. Belagodu (57) ABSTRACT

A capacitive contactless powering system (100) comprises a pair of receiver electrodes (141, 142) connected to a load (150) through a first inductor (160), wherein the first inductor is coupled to the load to resonate the system; a pair of transmitter electrodes (121, 122) connected to a driver (110); an insulating layer (130) having a first side and a second side opposite each other, wherein the pair of transmitter electrodes are coupled to the first side of the insulating layer and the pair of receiver electrodes are decoupled from the second side of the insulating layer, such that a capacitive impedance is formed between the pair of transmitter electrodes and the pair of receiver electrodes, wherein a power signal generated
(Continued)

by the driver is wirelessly transferred from the pair of transmitter electrodes to the pair of receiver electrodes to power the load when a frequency of the power signal matches a series-resonance frequency of the first inductor and the capacitive impedance.

20 Claims, 5 Drawing Sheets

Related U.S. Application Data filed on Aug. 16, 2011, provisional application No. 61/523,942, filed on Aug. 16, 2011, provisional application No. 61/523,935, filed on Aug. 16, 2011, provisional application No. 61/523,932, filed on Aug. 16, 2011, provisional application No. 61/585,343, filed on Jan. 11, 2012.

(51) Int. Cl.
*H02J 50/05* (2016.01)
*H02J 50/12* (2016.01)

(56) References Cited

U.S. PATENT DOCUMENTS

| | | | | |
|---|---|---|---|---|
| 8,552,596 | B2* | 10/2013 | Ichikawa | H02J 5/005 307/104 |
| 8,653,748 | B2* | 2/2014 | Roberts | H05B 33/0809 315/260 |
| 2004/0022058 | A1* | 2/2004 | Birrell | F21V 21/096 362/249.01 |
| 2007/0126393 | A1 | 6/2007 | Bersenev | |
| 2008/0076351 | A1* | 3/2008 | Washiro | H04B 5/0031 455/41.1 |
| 2009/0072782 | A1 | 3/2009 | Randall | |
| 2009/0159677 | A1* | 6/2009 | Yakimov | H05B 33/0896 235/439 |
| 2009/0184950 | A1 | 7/2009 | Furuta et al. | |
| 2009/0224061 | A1 | 9/2009 | Kato et al. | |
| 2009/0302690 | A1* | 12/2009 | Kubono | H02J 17/00 307/109 |
| 2010/0087143 | A1 | 4/2010 | Bonin | |
| 2010/0109443 | A1* | 5/2010 | Cook | H01Q 1/2225 307/104 |
| 2010/0117737 | A1* | 5/2010 | Kondo | H03F 1/0272 330/276 |
| 2010/0181841 | A1 | 7/2010 | Azancot et al. | |
| 2010/0190435 | A1 | 7/2010 | Cook et al. | |
| 2010/0201201 | A1 | 8/2010 | Mobarhan et al. | |
| 2010/0201314 | A1* | 8/2010 | Toncich | H02J 7/007 320/108 |
| 2010/0277003 | A1* | 11/2010 | Von Novak | H02J 17/00 307/104 |
| 2011/0046699 | A1* | 2/2011 | Mazanec | A61N 1/3787 607/61 |
| 2012/0038223 | A1* | 2/2012 | Harakawa | H02J 5/005 307/109 |
| 2012/0062174 | A1* | 3/2012 | Kamata | H02J 7/025 320/108 |
| 2012/0091818 | A1 | 4/2012 | Wesemann et al. | |
| 2012/0146431 | A1* | 6/2012 | Ichikawa | H02J 7/025 307/149 |
| 2012/0200158 | A1 | 8/2012 | Takei | |
| 2012/0244822 | A1* | 9/2012 | Kim | H02J 5/005 455/90.1 |

FOREIGN PATENT DOCUMENTS

| | | |
|---|---|---|
| EP | 2068418 A1 | 10/2009 |
| EP | 2199142 A1 | 6/2010 |
| JP | 1997312942 A | 12/1997 |
| JP | 2009089520 A | 4/2009 |
| JP | 2009296857 A | 12/2009 |
| JP | 2010148287 | 7/2010 |
| JP | 2010206871 A | 9/2010 |
| JP | 2011120443 A | 6/2011 |
| WO | 9801905 A1 | 1/1998 |
| WO | 2008137884 A1 | 11/2008 |
| WO | 2009072444 A1 | 6/2009 |
| WO | 2009089146 A1 | 7/2009 |
| WO | 2010070914 A1 | 6/2010 |
| WO | 2010095448 A1 | 8/2010 |
| WO | 2010150318 A1 | 12/2010 |
| WO | 2011042974 A2 | 4/2011 |

OTHER PUBLICATIONS

Kume et al, "Murata Develops Wireless Power Feeding System Using Electric Field Coupling", Tech & Industry Analysis From Asia, Jul. 1, 2010, 1 Page.

* cited by examiner

CAPACITIVE CONTACTLESS POWERING SYSTEM

This application claims the benefit of U.S. Provisional Applications 61/523,922 filed Aug. 16, 2011; 61/523,932 filed Aug. 16, 2011; 61/523,935 filed Aug. 16, 2011; 61/523,941 filed Aug. 16, 2011; 61/523,942 filed Aug. 16, 2011.

The invention generally relates to capacitive powering systems for wireless power transfers and, more particularly, to wireless power transfers over large areas.

A wireless power transfer refers to the supply of electrical power without any wires or contacts, whereby the powering of electronic devices is performed through a wireless medium. One popular application for contactless powering is for the charging of portable electronic devices, e.g., mobiles phones, laptop computers, and the like.

One implementation for wireless power transfers is by an inductive powering system. In such a system, the electromagnetic inductance between a power source (transmitter) and the device (receiver) allows for contactless power transfers. Both the transmitter and receiver are fitted with electrical coils, and when brought into physical proximity, an electrical signal flows from the transmitter to the receiver.

In inductive powering systems, the generated magnetic field is concentrated within the coils. As a result, the power transfer to the receiver pick-up field is very concentrated in space. This phenomenon creates hot-spots in the system which limits the efficiency of the system. To improve the efficiency of the power transfer, a high quality factor for each coil is needed. To this end, the coil should be characterized with an optimal ratio of inductance to resistance, be composed of materials with low resistance, and fabricated using a Litze-wire process to reduce skin-effect. Moreover, the coils should be designed to meet complicated geometries to avoid Eddy-currents. Therefore, expensive coils are required for efficient inductive powering systems. A design for contactless power transfer system for large areas would necessitate many expensive coils. Thus, for such applications an inductive powering system may not be feasible.

Capacitive coupling is another technique for transferring power wirelessly. This technique is predominantly utilized in data transfer and sensing applications. A car-radio antenna glued on the window with a pick-up element inside the car is an example of a capacitive coupling. The capacitive coupling technique is also utilized for contactless charging of electronic devices. For such applications, the charging unit (implementing the capacitive coupling) operates at frequencies outside the inherent resonant frequency of the device.

In the related art, a capacitive power transfer circuit that enables LED lighting is also discussed. The circuit is based on an inductor in the power source (driver). As such, only a single receiver can be used and the transmitter should be tuned to transfer the maximum power. In addition, such a circuit requires pixelated electrodes that ensure power transfer from the receiver and transmitter when they are not perfectly aligned. However, increasing the number of the pixelated electrodes increases the number of connections to the electrodes, thereby increasing the power losses. Thus, when having only a single receiver and limited size electrodes, the capacitive power transfer circuit discussed in the related art cannot supply power over a large area, e.g., windows, walls, and so on.

Therefore, it would be advantageous to provide a low cost and feasible solution for large areas for wireless powering applications.

Certain embodiments disclosed herein include a capacitive powering system. The system comprises a pair of receiver electrodes connected to a load through a first inductor, wherein the first inductor is coupled to the load to resonate the system; a pair of transmitter electrodes connected to a driver; an insulating layer having a first side and a second side opposite to each other, wherein the pair of transmitter electrodes are coupled to the first side of the insulating layer and the pair of receiver electrodes are decoupled from the second side of the insulating layer, thereby forming a capacitive impedance between the pair of transmitter electrodes and the pair of receiver electrodes, wherein a power signal generated by the driver is wirelessly transferred from the pair of transmitter electrodes to the pair of receiver electrodes to power the load when a frequency of the power signal matches a series-resonance frequency of the first inductor and the capacitive impedance.

Certain embodiments disclosed herein also include a method for capacitive contactless power transfer. The method comprises connecting a pair of receiver electrodes to a load through a first inductor; connecting a pair of transmitter electrodes to a driver; forming a capacitive impedance between the pair of transmitter electrodes and the pair of receiver electrodes by; coupling the pair of transmitter electrodes to a first side of an insulating layer; decoupling the pair of receiver electrodes from a second side of the insulating layer; tuning a frequency of a power signal generated by the driver to match a series-resonance frequency of the first inductor and the capacitive impedance; and wirelessly transferring the power signal from the pair of transmitter electrodes to the pair of receiver electrodes to power the load when the frequency of the power signal matches a series-resonance frequency of the first inductor and the capacitive impedance.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

It is important to note that the embodiments are only examples of the many advantageous uses of the innovative teachings herein. In general, statements made in the specification of the present application do not necessarily limit any of the various claimed inventions. Moreover, some statements may apply to some inventive features, but not to others. In general, unless otherwise indicated, singular elements may be in plural and vice versa with no loss of generality. In the drawings, like numerals are intended to refer to like parts through several views.

Figure 1:
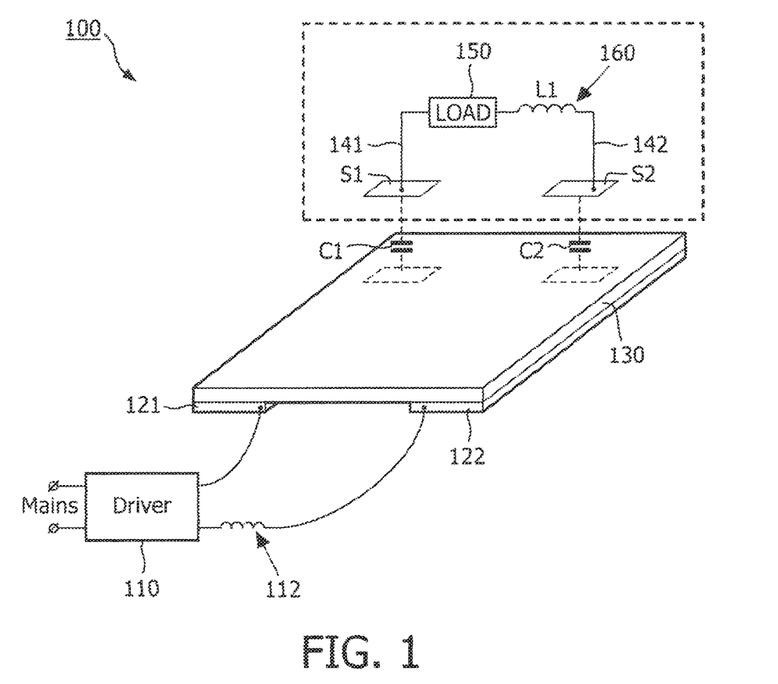
FIG. 1 is a capacitive power system according to an embodiment of the invention.

FIG. 1 shows a schematic diagram of a capacitive powering system 100 constructed according to an embodiment of the invention. The system 100 enables large area power transmissions. The system 100 can be installed in places where open electrical contacts are not preferred or are not desirable, such as bathrooms, retail-shops where regular variations are needed to illuminate a product, furniture, and the like. The system 100 can transfer power over a large area and thus can be utilized to power devices mounted on walls, windows, mirrors, floors, seats, aisles, and so on.

The system 100 includes a driver 110 connected to a pair of transmitter electrodes 121 and 122 which are attached to an insulating layer 130. The system 100 also includes a pair of receiver electrodes 141 and 142 connected to a load 150 and an inductor 160. Optionally, the system 100 may include an inductor 112 coupled to the driver 110.

In an embodiment of the invention, the connection between the transmitter electrodes 121,122 to the driver 110 is by means of a galvanic contact. In another embodiment, a capacitive in-coupling can be applied between the driver 110 and the electrodes 121,122, whereby no wire connections are needed. This embodiment is advantageous in a modular infrastructure for easy extension of the infrastructure.

A power is supplied to the load 150 by placing the receiver electrodes 141, 142 in proximity to the transmitter electrodes 121 and 122 without having a direct contact between the receiver and transmitter electrodes. Thus, no mechanical connection or electrical contact is required in order to power the load 150. The load 150 may be, but is not limited to, lighting elements (e.g., LED, LED string, a lamp, etc.), displays, computers, power charges, loudspeakers, and the like.

The driver 110 outputs an AC voltage signal having a frequency as the series-resonance frequency of a circuit consisting of a series of capacitors and inductors 112, 160. Shown in dotted lines in FIG. 1 the capacitors C1 and C2 are the capacitive impedance of the transmitter electrodes 121, 122 and receiver electrodes 141,142. The impedances of the capacitors and inductor 160 cancel each other at the resonance frequency, resulting in a low-ohmic circuit. Thus, the system 100 is capable of delivering power to the load 150 with very low power losses.

Figure 2:
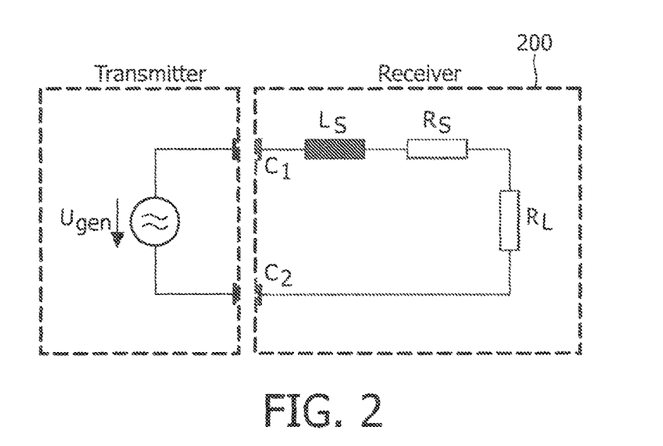
FIG. 2 is an electric diagram of the capacitive power system implemented according to an embodiment of the invention.

An electric diagram 200 of the system 100 is provided in FIG. 2. The maximum power is obtained when the frequency of the power signal $U_{gen}$ is close to the series-resonance of the circuit comprised of the load $R_L$, the resistor $R_S$ (representing the inductor resistance), capacitors $C_1$ and $C_2$, and inductor $L_S$. The series-resonance is determined by the values of the capacitors $C_1$, $C_2$ and inductor $L_S$. The values of the capacitors $C_1$, $C_2$ and inductor $L_S$ are selected such that they cancel each other at the operating frequency of the signal $U_{gen}$. Therefore, only the series resistance of the inductor $R_S$ and the connectivity of the electrodes limit the power transfer. It should be appreciated that this allows transferring AC signals characterized by high power with low frequency signals.

Returning to FIG. 1, the driver 110 generates an AC signal of which amplitude, frequency, and waveform can be controlled. The output signal typically has amplitude of tens of volts and a frequency of up to a few Mega hertz (MHz). In an exemplary embodiment, the output signal is typically 50V/400 kHz.

In one embodiment described herein, frequency tuning between the generated signal and series-resonance can be performed by changing the frequency, phase, or duty cycle of the signal output by the driver 110. In another embodiment, the frequency tuning can be achieved by changing the capacitance or inductive values of the circuit connected to the driver 110. As a non-limiting example, any of inductors 112 and 160 may be a tunable inductor (e.g., gyrator type of tuning). In addition, the system 100 may include a variable capacitor or a bank of switched capacitors to control the capacitance.

In an embodiment described herein, the driver 110 senses the phase of the voltage and current at its output to determine if the system 100 is tuned. In another embodiment, the phase of the voltage and current are measured in the receiver electrodes 141, 142. In both embodiments, the system 100 is tuned when the maximum current flows through the load 150. That is, the series-resonance frequency and the signal frequency do not match. The sensing may be performed at the operating frequency and higher harmonics of the same.

The insulating layer 130 is a thin layer substrate material that can be of any insulating material, including for example, air, paper, wood, textile, glass, DI-water, and so on. In one embodiment, a material with dielectric permittivity is selected. The thickness of the insulating layer 130 is typically between 10 microns (e.g., a paint layer) and a few millimeters (e.g., a glass layer).

The transmitter electrodes 121, 122 are comprised of two separate bodies of conductive material placed on one side of the insulating layer 130 that is not adjacent to the receiver electrodes 141, 142. For example, as illustrated in FIG. 1, the transmitter electrodes 121, 122 are at the bottom of the insulating layer 130. In another embodiment, the transmitter electrodes 121, 122 can be placed on opposite sides of the insulating layer 130. The transmitter electrodes 121, 122 can be any shape including, for example, a rectangle, a circle, a square, or combinations thereof. The conductive material of the each of the transmitter electrode may be, for example, carbon, aluminum, indium tin oxide (ITO), organic material, such as PEDOT, copper, silver, conducting paint, or any conductive material.

The receiver electrodes 141, 142 can be of the same conductive material as the transmitter electrodes 121, 122, or made of different conductive material. The total capacitance of the system 100 is formed by the overlap areas of respective transmitter and receiver electrodes 121, 141, and 122, 142, as well as the thickness and material properties of the insulating layer 130. The capacitance of the system 100 is illustrated as C1 and C2 in FIG. 1. In order to allow electrical resonance, the system 100 should also include an inductive element. This element may be in a form of one or more inductors that are part of the transmitter electrodes or the receiver electrodes, distributed over the driver 110 and the load (e.g., inductors 160 and 112 shown in FIG. 1), inductors incorporated within insulating layer 130, or any combination thereof. In one embodiment, an inductor utilized in the system 100 can be in a form of a lumped coil.

The load 150 allows for an AC bi-directional current flow. In an embodiment, the load 150 may include a diode or an AC/DC converter to locally generate a DC voltage. The load 150 may further include electronics for controlling or programming various functions of the load 150 based on a control signal generated by the driver 110. To this end, in one embodiment the driver 110 generates a control signal that is modulated on the AC power signal. For example, if the load 150 is an LED lamp, a control signal output by the driver 110 may be utilized for dimming or color setting of the LED lamp.

Another embodiment for dimming and/or color setting of a lamp acting as a load 150 includes misplacing the transmitter and receiver electrodes, i.e., when the respective electrodes 121/141 and 122/144 do not fully overlap each other. In such a case, the electrical circuit is out of resonance, whereby less power is transferred from the driver 110 to the lamp (load 150). The state in which the circuit does not resonate is also referred to as detuning.

Other embodiments for detuning the system 100 include adding capacitance, inductance or resistance in the load 150 (e.g., lamp), or in the path from the driver 110 to the lamp, placing the lamp on or at another location of the infrastructure, or using a feedback signal generated by the lamp and sent to the driver 110. The feedback is provided using a button on the lamp that generates a short detuning that is measured in the driver. The driver 110, based on the feedback, changes the power and/or the frequency of the output AC signal.

In an embodiment, the correct placement of the receiver electrodes 141,142 with respect to the transmitter electrodes 121, 122 can be determined using a location indicator that provides an indication when the maximum power or power above a predefined threshold is transferred from the driver 110 to the load 150. The location indicator may be part of the driver 110 or integrated in the load 150. The indication may be in form of, for example, a lit LED, a sound, a liquid crystal display displaying a message or a measure of the transferred power, and so on. It should be further noted that the location indicator can also be utilized to detect power hot spots in the system 100.

The capacitive powering system 100 shown in FIG. 1 can be utilized as a wireless extension of a power cord. According to this configuration, the driver 110 is installed in a wall-plug connector with wired output and a sticker including at least two conductive areas, acting as the transmitter electrodes 121,122. The receiver electrodes 141,142 include at least two stickers, a wire, and a connector socket. The receiver electrodes 141,142 may also contain an electronic means for voltage regulation. Such a system allows for power transfer to adjacent rooms or cupboards without the need for drilling holes for wiring purposes.

In another embodiment capacitive wireless power can be used to power the organic light emitting diode (OLED) surfaces. An OLED is a technology where the LED is formed on a flat surface. According to this embodiment, the receiver electrodes and transmitter electrodes are placed on the backside of the OLED surface.

The capacitive powering system 100, as exemplary illustrated in FIG. 1, depicts a single load 150 that is powered by the driver 110. However, it should be noted that the driver 110 can also power multiple loads, each of which may be tuned to a different operational frequency. In such a configuration, the frequency of a signal outputted by the driver 110 determines which device will be powered. The driver 110 may also generate an AC sweep signal (a signal with a varied frequency). When fast enough, the frequency sweep will power the devices during the period that the frequency of the AC signal coincides with respective load resonance tuning. In this way, several loads tuned to different frequencies can be powered in a multiplexed way. To fill the power-less gaps in between sweeps, batteries and/or capacitors can be added.

In another embodiment, a spread spectrum powering of the load is provided. Accordingly, an AC power signal characterized by a large band of frequencies is generated by the driver 110, allowing each individual load in a group of multiple loads to be tuned within a range of different frequencies. Therefore, each individual load may be powered independently.

In capacitive powering systems that include multiple loads, the power consumed by the different loads may be different from each other. The power of the AC signal is determined by the load that consumes the highest power. When a "high power load" and a "low power load" are connected in the system, the power AC signal can damage the latter load. To overcome this problem an overload protection is required.

Figure 3:
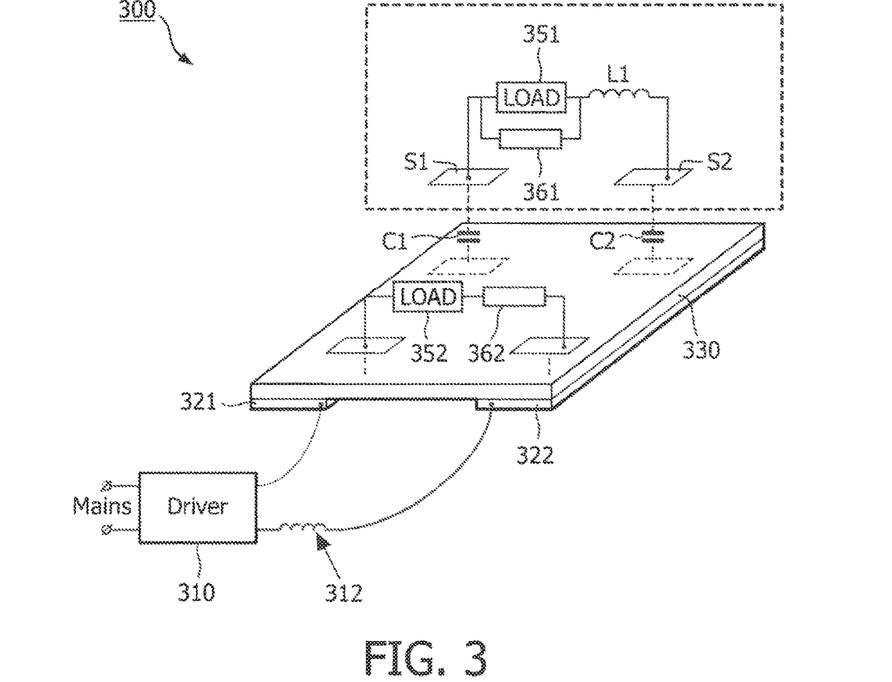
FIG. 3 is a diagram of a capacitive powering system including multiple loads according to an embodiment of the invention.

FIG. 3 shows an exemplary diagram of a capacitive powering system 300 that includes two loads 351 and 352 powered by an AC signal generated by the driver 310. The system 300 includes transmitter and receiver electrodes, an insulating layer, and inductive elements as discussed in detail above. In order to protect the respective loads 351 and 352, limiters 361 and 362 are added to the circuit 300.

A limiter can be connected in series to the load to limit the current of a signal that powers the load. Alternatively, the limiter may be connected in parallel to the load to limit the voltage that powers the load. As shown in FIG. 3, the limiter 361 is connected in parallel to the load 351, while the limiter 362 is connected in series to the load 352.

According to one embodiment, a voltage limiter (e.g., limiter 361) measures the voltage applied across the load 351 and switches the signal off when its amplitude level is above a reference voltage value. The signal is switched on (i.e., the signal is supplied to the load) when the amplitude level of the signal is below a reference voltage value.

A current limiter (e.g., limiter 362) measures the current flow through the load 352, and the signal is switched on or off depending on whether the measured current value is above or below a reference current value. The voltage and current values are set according to the maximum allowable power that would not overload the load. In an alternative embodiment the limiter may be integrated in the load.

In another embodiment, protecting the load may be achieved by detuning the circuit. As discussed earlier, when the circuit is out of resonance, less power is transferred from the driver to the load. Thus, detuning the circuit controls the power on the load, and this process can be utilized to limit the power on the load. As the detuning includes relocating the transmitter and receiver electrodes, the various loads (e.g., loads 351 and 352) can be independently protected.

As mentioned above, the maximum power transmission in the capacitive powering system disclosed herein is achieved when the resistance of the load is equal or higher to the loss resistance of the circuit. Furthermore, the ratio of the load resistance to the series loss resistance determines the power efficiency of the system. However, this may apply a constraint on the system efficiency, as the resistance of the load is given and cannot be freely selected. For example, the resistance of a lamp or an LED string is fixed and may not adhere to the electrical properties of the system to achieve an optimized efficiency.

In order to overcome such a constraint, according to certain embodiments of the invention, the receiver part of the capacitive powering system includes a matching circuit, which transforms the load resistance and impedance to an equivalent loss resistance and impedance, thereby optimizing the power and overall efficiency of the system.

Figure 4:
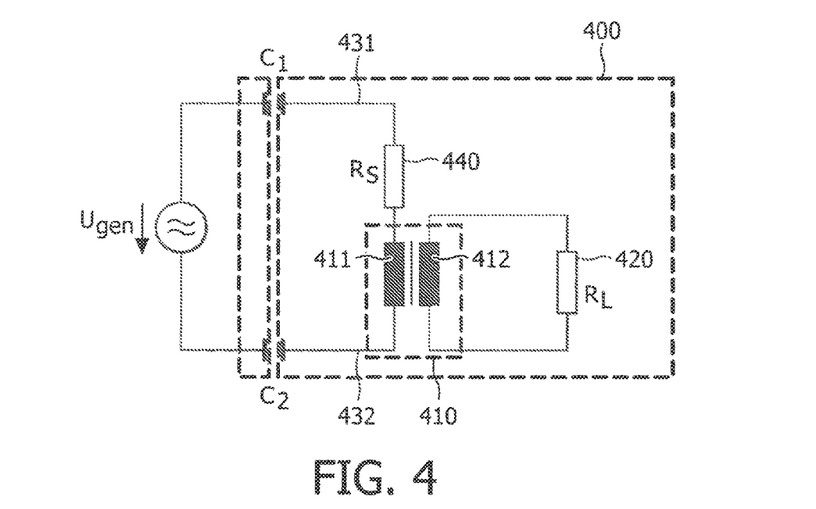
FIG. 4 is an electrical diagram of a capacitive powering system with a passive matching circuit according to an embodiment of the invention.

FIG. 4 shows a non-limiting and exemplary electrical diagram of a capacitive powering system 400 with a passive matching circuit 410 designed according to an example embodiment of the invention. Using the passive matching circuit 410, the resistance of load 420 can be transformed by a fixed value equivalent to or higher than the loss resistance of the system 400. In the embodiment depicted in FIG. 4, the inductor (e.g., inductor 160 shown in FIG. 1 and $L_S$ of FIG. 2) is replaced with the passive matching circuit 410 implemented as a transformer. The transformer transfers an AC signal ($U_{gen}$) from receiver electrodes 431, 432 to the load 420 through inductively coupled conductors, i.e., the transformer coils 411 and 412.

The transformer is built in such a way that the stray inductance between the coils 411 and 412 is minimized. The ratio of the number of turns between a primary coil 411 and a secondary coil 412 of the transformer is selected such that the resistance ($R_L$) would be equivalent to or higher than the loss resistance of the system 400.

The magnitude of the voltage in the secondary coil 412 is determined by a turns ratio (N) of the transformer 410 being computed by dividing the number of turns of the secondary coil (Ts) 412 by the number of turns of a primary coil (Tp), i.e., (N=Ts/Tp).

The voltage in the secondary coil (Vs) 412 is a multiplication of the voltage in the primary coil (Vp_411 by the turns ratio N). Thus, if a voltage of 240V AC is applied to the primary coil 411 and the turns ratio is 1:10, then 24V falls on the secondary coil 412. For example, if a current of 1 A is drawn by the primary coil 411, then ideally a current of 10 A would be available at the secondary coil 412 due to the turns ratio. Thus, an equivalent load resistance is 240V/1 A=240 Ohms which can be transformed to an equivalent output resistance 24V/10 A=2.4 Ohms.

The loss resistance is represented by a resistor $R_S$ 440. This ensures matching the electrical requirements of the capacitive powering system 400, thereby optimizing the efficiency of the system. In an embodiment of the invention, the matching circuit 410 is implemented using a tapped inductor.

Figure 5:
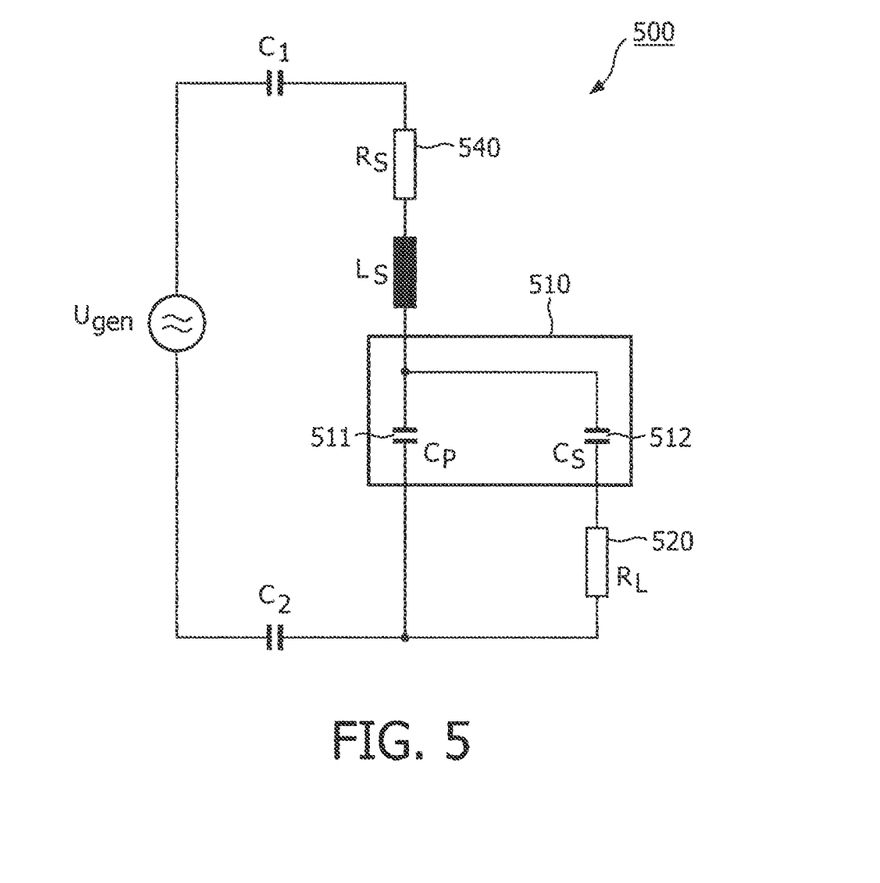
FIG. 5 is an electrical diagram of a capacitive powering system with a passive capacitive matching circuit according to an embodiment of the invention.

FIG. 5 shows a non-limiting and exemplary electrical diagram of a capacitive powering system 500 with a passive matching circuit 510 designed according to another exemplary embodiment. Using passive matching circuit 510, the resistance of the load 520 can be transformed by a fixed value equivalent to or higher than the loss resistance of the system 500. The passive matching circuit 510 is implemented as a capacitive matching circuit including two parallel capacitors 511 and 512 connected to the load 520, as illustrated in FIG. 5. The capacitance value of each of the capacitors is selected such that at the operating frequency of the transformed load resistance is equivalent to or higher than the loss resistance of the system 500. Specifically, the current through the load resistor can be scaled by the capacitance ratio between parallel capacitors 511 and 512. The loss resistance is represented by a resistor $R_S$ 540. This ensures matching the electrical requirements of the capacitive powering system 500, thereby optimizing the efficiency of the system 500. It should be noted that additional capacitors 511 and 512 should be considered in order to meet the resonance condition required for the proper operation of the system 500.

Figure 6:
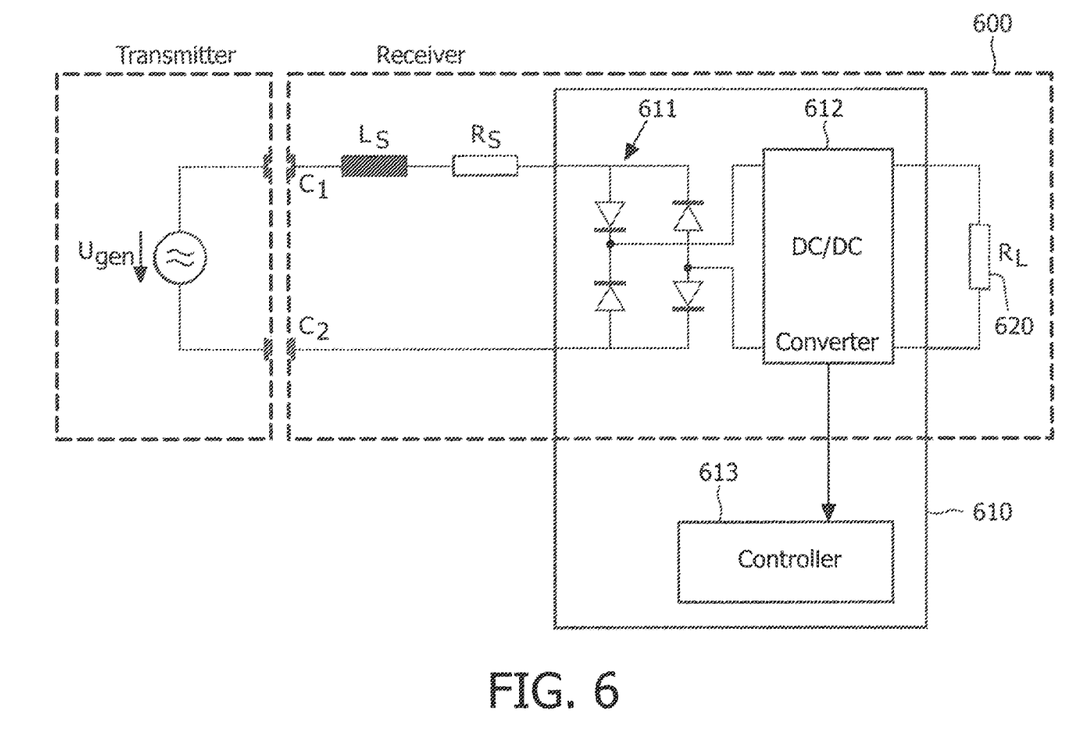
FIG. 6 is an electrical diagram of a capacitive powering system with an active matching circuit according to an embodiment of the invention.

FIG. 6 shows a non-limiting and exemplary electrical diagram of a capacitive powering system 600 with an active matching circuit 610 designed according to another embodiment. Using the active matching circuit 610, the resistance of the load 620 can be transformed by a fixed value equivalent to or higher than the loss resistance of the system 600. In an embodiment of the invention, the active matching circuit 610 is connected in parallel to the load 620 and includes a voltage rectifier 611, a DC/DC converter 612, and a controller 613. The DC/DC converter 612 may be, for example, a step-down converter or a step-up converter.

A DC/DC converter converts a source of DC from one voltage level to another. The energy is periodically stored into and released from a magnetic field in an inductor or a transformer. By adjusting the duty cycle of the charging voltage, the amount of power transferred can be controlled, and specifically the impedance ratio of the DC/DC converter can be set. According to one embodiment, the controller 613 measures the voltage and current at the load 620 to determine the output power and load resistance. The controller 613 measures the rectified voltage at the rectifier 611. Using the measured values, the controller 613 changes the duty cycle of the charging voltage at the DC/DC converter 612, thereby changing the output impedance of the DC/DC converter 612 to match the impedance of the load 620. An optimal matching is achieved when the current flows through the load resistor is measured to be maximal. This ensures matching the electrical requirements of the capacitive powering system 600, thereby optimizing the efficiency of the system.

In the capacitive powering system discussed above, the potential at the transmitter electrodes may be very high, if the circuit is in resonance. As mentioned above and illustrated, for example, in FIG. 2, the load $R_L$ is connected to one of the receiver electrodes, and as such it is connected to the high alternating potential. This may be a safety hazard. In addition, the load $R_L$ may be on high alternating potential against the reference potential of the driver $U_{gen}$. As a result, a high parasitic capacitive current may flow from the load to the driver $U_{gen}$ as undesired common mode current may flow to the receiver electrodes. This may also induce electromagnetic interference (EMI) in the circuit.

Figure 7:
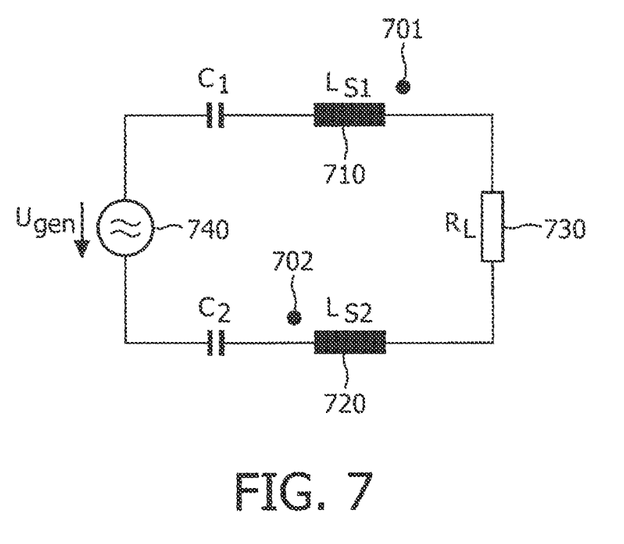
FIG. 7 is an electrical diagram of a capacitive powering system with a safe electrical potential resonant circuit according to an embodiment of the invention.

To overcome this problem, according to an embodiment illustrated in FIG. 7, the resonant receiver is split into two symmetrical parts. A first receiver electrode is coupled to inductor 710 ($L_{S1}$), and a second receiver electrode is coupled to inductor 720 ($L_{S2}$). In this arrangement, the points of high potential are limited in the receiver circuit, and the load 730 ($R_L$) is on the same electrical potential as driver 740 ($U_{gen}$).

In addition, the arrangement illustrated in FIG. 7, eliminates EMI. That is, with two inductors 710 and 720, there is no different potential between the load 730 and the driver 740. Therefore, no undesired common mode currents flow between the driver 740 and the load 730. In one embodiment, the two inductors 710 and 720 may be magnetically coupled. Then, they can be wound as two windings on one a core and only one device is necessary. Furthermore, less turns are necessary as the windings enhance each other due to the magnetic coupling. The winding orientation must be opposite, as indicated by dots 701 and 702.

The principles of various embodiments of the invention can be implemented as hardware, firmware, software or any combination thereof. Moreover, the software is preferably implemented as an application program tangibly embodied on a program storage unit, a non-transitory computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A capacitive powering system, comprising:
a pair of receiver electrodes connected to a load and a first inductor;
a pair of transmitter electrodes connected to a driver; and
an insulating layer having a first side and a second side opposite each other, wherein the pair of transmitter electrodes is coupled to the first side of the insulating layer and the pair of receiver electrodes is decoupled from the second side of the insulating layer, such that a capacitive impedance is formed between the pair of transmitter electrodes and the pair of receiver electrodes, wherein a power signal generated by the driver is wirelessly transferred from the pair of transmitter electrodes to the pair of receiver electrodes to power the load with a first power when said pair of receiver electrodes are aligned to overlap with said pair of transmitter electrodes so that a frequency of the power signal matches a series-resonance frequency of the first inductor and the capacitive impedance, and
wherein said system is configured such that misaligning said pair of receiver electrodes to partially overlap with said pair of transmitter electrodes results in said load receiving a total power that is less than said first power.

2. The system of claim 1, wherein the system is tuned to resonate at the series-resonance frequency by at least one of: changing inductance of the first inductor, changing a position of the receiver electrodes relative to the transmitter electrodes, and changing a frequency of the power signal.

3. The system of claim 1, further comprising a plurality of loads each being connected to a different pair of receiver electrodes and resonating at a different series-resonance frequency, wherein each load of the plurality of loads is powered by the power signal generated by the driver and wirelessly transferred through the pair of transmitter electrodes.

4. The system of claim 3, wherein each load of the plurality of loads resonates at the same series-resonance frequency.

5. The system of claim 3, wherein at least one load of the plurality of loads is protected by a limiter, wherein the limiter is one of a voltage limiter connected in parallel to the at least one load and a current limiter connected in a series to the at least one load.

6. The system of claim 5, wherein the voltage limiter switches off the power signal when an amplitude voltage level on the at least one load is above a reference voltage value.

7. The system of claim 5, wherein the current limiter switches off the power signal when a current flowing through the at least one load is above a reference current value.

8. The system of claim 3, wherein each load of the plurality of loads is at least any one of: a lamp, a light emitting diode (LED) string, and a LED lamp.

9. The system of claim 8, wherein the insulating layer is part of the receiver electrodes, and wherein the insulating layer is at least any one of: paper, wood, textile, glass, and a paint layer.

10. The system of claim 9, wherein the system is configured to wirelessly power a plurality of any one of lamps, LED strings, and LED lamps mounted on a large area structure.

11. The system of claim 1, further comprising a matching circuit connected to the pair of receiver electrodes, wherein the matching circuit transforms a resistance of the load to a fixed resistance that is at least equal to a loss resistance of the system.

12. The system of claim 11, wherein the matching circuit is at least a passive matching circuit that comprises a transformer being replaced by the first inductor, and wherein a ratio of a number of turns between a primary coil and a secondary coil of the transformer is selected to increase the load resistance above a value of the loss resistance.

13. The system of claim 1, wherein said load outputs light, and wherein said system is configured such that said misaligning said pair of receiver electrodes to partially overlap with said pair of transmitter electrodes dims said light and/or alters a color setting of said light.

14. The system of claim 1, wherein said load outputs light, and wherein said system is configured such that said misaligning said pair of receiver electrodes to partially overlap with said pair of transmitter electrodes dims said light.

15. The system of claim 1, wherein said load outputs light, and wherein said system is configured such that said misaligning said pair of receiver electrodes to partially overlap with said pair of transmitter electrodes alters a color setting of said light.

16. A capacitive powering system, comprising:
a pair of receiver electrodes connected to a load and a first inductor;
a pair of transmitter electrodes connected to a driver;
an insulating layer having a first side and a second side opposite each other, wherein the pair of transmitter electrodes is coupled to the first side of the insulating layer and the pair of receiver electrodes is decoupled from the second side of the insulating layer, such that a capacitive impedance is formed between the pair of transmitter electrodes and the pair of receiver electrodes, wherein a power signal generated by the driver is wirelessly transferred from the pair of transmitter electrodes to the pair of receiver electrodes to power the load when a frequency of the power signal matches a series-resonance frequency of the first inductor and the capacitive impedance; and
a matching circuit connected to the pair of receiver electrodes, wherein the matching circuit transforms a resistance of the load to a fixed resistance that is at least equal to a loss resistance of the system,
wherein the matching circuit is at least an active matching circuit including a voltage rectifier, a DC-to-DC converter, and a controller, wherein the controller is configured to measure a voltage level at the rectifier, and change a duty cycle of a charging voltage at the DC-to-DC converter based on the measured voltage level, wherein changing the charging voltage causes an output impedance of the DC-to-DC converter to match an impedance of the load.

17. A method of capacitive contactless power transfer, comprising:

connecting a pair of receiver electrodes to a load and a first inductor;

connecting a pair of transmitter electrodes to a driver;

forming a capacitive impedance between the pair of transmitter electrodes and the pair of receiver electrodes by:

coupling the pair of transmitter electrodes to a first side of an insulating layer;

decoupling the pair of receiver electrodes from a second side of the insulating layer; and tuning a frequency of a power signal generated by the driver to match a series-resonance frequency of the first inductor and the capacitive impedance;

wirelessly transferring the power signal from the pair of transmitter electrodes to the pair of receiver electrodes to power the load with a first power when said pair of receiver electrodes are aligned to overlap with said pair of transmitter electrodes so that the frequency of the power signal matches a series-resonance frequency of the first inductor and the capacitive impedance; and misaligning said pair of receiver electrodes to partially overlap with said pair of transmitter electrodes, wherein said misaligning results in said load receiving a total power that is less than said first power.

18. The method of claim 17, further comprising detuning from the series-resonance frequency to control a functionality of the load.

19. The method of claim 17, wherein said load outputs light, and wherein said misaligning said pair of receiver electrodes to partially overlap with said pair of transmitter electrodes dims said light.

20. The method of claim 17, wherein said load outputs light, and wherein said misaligning said pair of receiver electrodes to partially overlap with said pair of transmitter electrodes alters a color setting of said light.

* * * * *